United States Patent [19]
Jennings, Jr. et al.

[11] Patent Number: 4,807,702
[45] Date of Patent: Feb. 28, 1989

[54] METHOD FOR IMPROVING HIGH IMPULSE FRACTURING

[75] Inventors: Alfred R. Jennings, Jr., Plano; Lloyd G. Jones, Dallas, both of Tex.

[73] Assignee: Mobil Oil Corporation, New York, N.Y.

[21] Appl. No.: 151,763

[22] Filed: Feb. 3, 1988

Related U.S. Application Data

[62] Division of Ser. No. 946,259, Dec. 24, 1986, Pat. No. 4,739,832.

[51] Int. Cl.⁴ .................. E21B 43/24; E21B 43/263; E21B 43/267; E21B 43/27
[52] U.S. Cl. ................... 166/299; 166/300; 166/302; 166/307; 166/308
[58] Field of Search ............. 166/57, 63, 299, 300, 166/302, 307, 308

[56] References Cited

U.S. PATENT DOCUMENTS

| | | | |
|---|---|---|---|
| 1,351,945 | 9/1920 | Dulany | 166/300 |
| 2,218,306 | 10/1940 | Austerman | 166/300 |
| 2,766,828 | 10/1956 | Rachford, Jr. | 166/299 |
| 2,997,104 | 8/1961 | Burch | 166/300 X |
| 3,233,672 | 2/1966 | Carpenter | 166/307 |
| 3,630,284 | 12/1971 | Fast et al. | 166/299 |
| 4,007,791 | 2/1977 | Johnson | 166/300 |
| 4,039,030 | 8/1977 | Godfrey et al. | 166/299 |
| 4,428,432 | 1/1984 | Pabley | 166/307 X |
| 4,482,016 | 11/1984 | Richardson | 166/300 |
| 4,590,997 | 5/1986 | Stowe | 166/250 |

Primary Examiner—George A. Suchfield
Attorney, Agent, or Firm—Alexander J. McKillop; Charles J. Speciale; Charles A. Malone

[57] ABSTRACT

A process for improving the effectiveness of control pulse fracturing in a carbonate formation wherein a high energy impulse device having a metallic sheath reactive with a retarded acid is utilized in combination with a retarded acid. Upon placement of such device within a wellbore, the metallic sheath reacts with the retarded acid and generates heat which activates said acid. Afterwards, the high energy impulse device is ignited which fractures the formation and forces the activated acid into the created fractures thereby enhancing acid contact with said formation.

7 Claims, No Drawings

METHOD FOR IMPROVING HIGH IMPULSE FRACTURING

This application is a divisional of copending application Ser. No. 946,259, filed on Dec. 24, 1986, now U.S. Pat. No. 4,739,832.

FIELD OF THE INVENTION

The invention relates to the treatment of a subterranean formation where a retarded acid is used in combination with high impulse fracturing to improve the effectiveness of said fracturing and the acid reaction.

BACKGROUND OF THE INVENTION

It is a common practice to acidize subterranean formations in order to increase the permeability thereof. For example, in the petroleum industry it is conventional to inject an acidizing fluid into a well in order to increase the permeability of a surrounding hydrocarbon-bearing formation and thus facilitate the flow of hydrocarbon fluids into the well from the formation or the injection of fluids, such as gas or water, from the well into the formation. Such acidizing techniques may be carried out as "matrix acidizing" procedures or as "acid-fracturing" procedures.

In acid fracturing the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the fractures formed as well as by the chemical reaction of the acid within the formation.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical disruptions within the formation as in fracturing.

In yet another technique involving acidizing, the formation is fractured. Thereafter, an acidizing fluid is injected into the formation at fracturing pressures to extend the created fracture. The acid functions to dissolve formation materials forming the walls of the fracture, thus increasing the width and permeability thereof.

In most cases, acidizing procedures are carried out in calcareous formations such as dolomites, limestones, dolomitic sandstones, etc. One difficulty encountered in the acidizing of such a formation is presented by the rapid reaction rate of the acidizing fluid with those portions of the formation with which it first comes into contact. This is particularly serious in matrix acidizing procedures. As the acidizing fluid is forced from the well into the formation, the acid reacts rapidly with the calcareous material immediately adjacent the well. Thus, the acid becomes spent before it penetrates into the formation a significant distance from the well. For example, in matrix acidizing of a limestone formation it is common to achieve maximum penetration with a live acid to a depth of only a few inches to a foot from the face of the wellbore. This, of course, severely limits the increase in productivity or injectivity of the well.

In order to increase the penetration depth it has heretofore been proposed to add a reaction inhibitor to the acidizing fluid. For example, in U.S. Pat. No. 3,233,672 issued to N. F. Carpenter there is disclosed an acidizing process in which inhibitors such as alkyl-substituted carboximides and alkyl-substituted sulfoxides are added to the acidizing solution. Another technique for increasing the penetration depth of an acidizing solution is that disclosed by U.S. Pat. No. 3,076,762 issued to W. R. Dill, wherein solid, liquid, or gaseous carbon dioxide is introduced into the formation in conjunction with the acidizing solution. The carbon dioxide acts as a coolant thus retarding the reaction rate of the acid with the formation carbonates. Also, the carbon dioxide is said to become solubilized in the acidizing solution, thus resulting in the production of carbonic acid which changes the equilibrium point of the acid-carbonate reaction to accomplish a retarding effect.

An additional procedure disclosed in U.S. Pat. No. 2,850,098 issued to Moll et al. involves the removal of contaminates from a water well and the adjacent formation through the injection of gaseous hydrogen chloride. Still another technique for acidizing a calcareous formation is disclosed in U.S. Pat. No. 3,354,957 issued to Every et al. In this process liquid anhydrous hydrogen chloride is forced from a well into the adjacent formations. The liquid hydrogen chloride vaporizes within the formation and the resulting gas dissolves in the formation water to form hydrochloric acid which then attacks the formation.

Therefore, what is needed is a method whereby a formation can be acidized and simultaneously fractured wherein the acid in its reactive state can penetrate deeply into a formation thereby increasing its permeability.

SUMMARY OF THE INVENTION

This invention relates to a method for increasing the permeability of a formation where high impulse fracturing device is used in combination with an inhibited acid. In the practice of this invention, an inhibited acid is directed into a wellbore contained in the formation which acid is in an amount sufficient to substantially submerge a desired formation interval of the formation. A two-stage high impulse device is then submerged in said acid within said wellbore. Thereafter, a first stage of said high impulse fracturing device is ignited causing said retarded acid to become activated by heat generated from said device. Next, the second stage of said impulse device is ignited, thereby inducing vertical radial fractures in said formation and simultaneously forcing said activated acid into said fractures which increases the permeability of said formation.

It is therefore an object of this invention to create multiple simultaneous radial fractures in a formation while acidizing said formation.

It is another object of this invention to enhance the reactivity of an acid with the formation by contacting said acid with a greater area of the formation when multiple simultaneous radial fractures are created.

It is yet another object of this invention to increase the permeability of a formation and stimulate said formation to produce increased volumes of hydrocarbonaceous fluids.

It is still yet another object of this invention to increase the permeability of a calcareous formation containing hydrocarbonaceous fluids for production therefrom while minimizing damage to the wellbore.

DESCRIPTION OF THE PREFERRED EMBODIMENTS

In the practice of this invention, an inhibited acid is directed into a wellbore located in a formation, preferably a hydrocarbonaceous fluid containing one. The method of this invention is particularly suited for calcareous formations containing carbonates therein. The solution of acid employed may be any of the aqueous solutions of acid commonly employed for acidizing subterranean calcareous formations. For example, the solution of acid may be an aqueous solution of hydrochloric acid. Commonly, the aqueous solutions of hydrochloric acid employed for acidizing subterranean calcareous formations contain between 5 and 28 percent by weight of hydrogen chloride. An aqueous solution of acetic acid may be also employed. Additionally, an aqueous solution of formic acid may be employed. As is known, when the acid solution becomes spent as the result of reacting with the material of the formation, the solubility of calcium sulfate, i.e., anhydrite or gypsum, dissolved in the acid decreases. Thus, any calcium sulfate dissolved from the formation or derived from the water employed in preparing the solution of acid can precipitate with a consequent decrease in the permeability of the formation. Accordingly, it is preferred that the solution of acid that is employed contain an agent to inhibit the precipitation of calcium sulfate. Thus, where hydrogen chloride is employed, the solution thereof may contain up to 40 percent by weight of calcium chloride. Additionally, the solution of acid may also contain any of the commonly employed inhibitors for prevention of corrosion of metal equipment such as casing, liner, or tubing in the well.

The amount of solution of acid to be employed will vary according to the radial distance from the well to which the formation is to be acidized and, as stated, this distance may vary up to 15 feet but will not, in most cases, exceed about 10 feet from the well. The amount of solution of acid to be employed will also vary according to the extent to which the material of the formation is to be dissolved. Preferably, the amount of acid should be one hydrocarbon pore volume of the portion of the formation to be acidized. However, lesser amounts may be employed. Generally, the amount employed will be that ordinarily employed in conventional, commercial acidizing operations.

Also, as disclosed in U.S. Pat. No. 3,233,672 issued to Carpenter, inhibitors such as alkyl-substituted carboximides and alkyl-substituted sulfoxides can be added to the acidizing solution. This patent is hereby incorporated by reference.

After the inhibited acid has been placed into the wellbore to the desired formation interval sought to be treated, a two-stage high energy impulse device containing propellants therein is located within the wellbore. The first stage contains a propellant suitable for generating sufficient heat to decompose the inhibitors contained in said acid solution. Propellant contained in the second stage is sufficient to create simultaneous multiple radial fractures and force the now reactive acid into the created fractures within the formation.

Said propellant can belong to the modified nitrocellulose or the modified or unmodified nitroamine propellant class. Another suitable propellant is a composite propellant which contains ammonium perchlorate in a rubberized binder. Other suitable propellants are discussed in U.S. Pat. No. 4,590,997 which issued to Stowe on May 27, 1986. This paten is hereby incorporated by reference.

Having previously placed said propellant device into the wellbore, the first stage of the high energy impulse device is ignited. This causes heat and pressure to be generated which is sufficient only to break down inhibitors contained in the acid solution and commence etching the formation via perforations contained in the wellbore. Thereafter, the second stage of the high energy impulse device is ignited. Ignition of the propellant contained in the second stage generates heat and pressure sufficient to create simultaneous multiple radial fractures within the formation. Upon the creation of these fractures, the reactive acid is forced into said fractures. Once the acid has entered the formation via said fractures, the acid reacts with the formation thereby increasing the permeability within said formation. This increase in permeability allows for increased volumes of hydrocarbonaceous fluids to be produced from a formation containing same.

In another embodiment of this invention, a sheath into which the propellant is placed can be composed of a metal reactive with an inhibited acid, such as aluminum or magnesium. The reactive metal will initiate a heat generating exothermic reaction. The sheath should be composed of said reactive metal in a thickness so as to generate sufficient heat to destroy or break down the inhibitors contained in the inhibited acid. The time required for a generation of heat needed to break down said inhibitors can be determined by laboratory measurements for example. These measurements of course would take into consideration the metal and acid utilized, the volume of acid within the wellbore, as well as the thickness of metal needed to maintain the integrity of the propellant contained in the high impulse device. If needed, said device in said sheath, along with additional metal can be suspended into the wellbore, either above or below said device. When the time for generating sufficient heat to break down the inhibitors has elapsed, the propellant sufficient for fracturing the formation is ignited. This ignition, as before, causes heat and pressure to be generated sufficient to form simultaneous multiple radial fractures which emanate from the wellbore into the formation while simultaneously forcing acid into the created fractures. When carrying out this embodiment, a first propellant stage is unnecessary.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for increasing the permeability of a carbonate formation containing hydrocarbonaceous fluids where high energy impulse fracturing is used in combination with an inhibited acid comprising:
   (a) directing an inhibited acid into a wellbore contained in said formation which acid is in an amount sufficient to substantially submerge the interval of the formation desired to be fractured;
   (b) determining the amount of metal to be contained in a metallic sheath which encases a propellant for a high energy impulse device and the time necessary for sufficient heat to be generated from a reaction of said metal with the acid to destroy inhibitors contained in said acid;

(c) locating the high energy impulse device encased in said sheath within the acid in said wellbore near said interval;

(d) reacting said acid with the metallic sheath and generating heat sufficient to destroy the inhibitors which activates said acid; and (e) igniting said propellant after sufficient heat has been generated to destroy said inhibitors thereby creating more than two simultaneous multiple radial fractures in said formation and simultaneously causing the uninhibited acid to enter said fractures thereby increasing the formation's permeability.

2. The method as recited in claim 1 where in step (a) said inhibited acid comprises acetic acid, hydrochloric acid, or formic acid.

3. The method as recited in claim 1 where in step (a) said wellbore contains perforations.

4. The method as recited in claim 1 where hydrocarbonaceous fluids are produced from said formation after step (e).

5. The method as recited in claim 1 where in step (b) said metal sheath comprises aluminum or magnesium and mixtures thereof.

6. The method as recited in claim 1 where in step (c) additional metal is placed in close proximity to said device so as to generate additional heat.

7. The method as recited inclaim 1 where in step (a) said inhibited acid comprises acetic acid, hydrochloric acid, or formic acid in an amount of from about 5 to about 28 percent by weight.

* * * * *